United States Patent [19]

Gautier

[11] Patent Number: 5,214,995
[45] Date of Patent: Jun. 1, 1993

[54] METHOD FOR ADJUSTING THE JUMP VALUE OF A PNEUMATIC BRAKE-BOOSTER AND BOOSTER FOR IMPLEMENTING THIS METHOD

[75] Inventor: Jean-Pierre Gautier, Aulnay-Sous-Bois, France

[73] Assignee: Bendix Europe Services Techniques, Drancy, France

[21] Appl. No.: 736,874

[22] Filed: Jul. 29, 1991

[30] Foreign Application Priority Data

Sep. 7, 1990 [FR] France .................... 90 11099

[51] Int. Cl.$^5$ .................... F15B 9/10; F15B 13/16
[52] U.S. Cl. .................... 91/376 R; 91/369.1; 91/389
[58] Field of Search ........... 91/369.2, 374, 376 R, 91/377, 389

[56] References Cited

U.S. PATENT DOCUMENTS

| 4,671,167 | 6/1987 | Endo et al. ............ 91/389 X |
| 4,813,338 | 3/1989 | Mortimer et al. ...... 91/376 R X |
| 4,817,500 | 4/1989 | Gautier ............... 91/376 R |
| 4,984,506 | 1/1991 | Perez ................. 91/376 R X |
| 5,016,520 | 5/1991 | Gautier ............... 91/376 R X |

FOREIGN PATENT DOCUMENTS

| 3205268 | 8/1983 | Fed. Rep. of Germany . |
| 2064690 | 6/1981 | United Kingdom . |
| 2086504 | 5/1982 | United Kingdom . |
| 2140518 | 11/1984 | United Kingdom . |

Primary Examiner—Edward K. Look
Assistant Examiner—John Ryznic
Attorney, Agent, or Firm—Larry J. Palguta; Ken C. Decker

[57] ABSTRACT

An assembled brake booster, including a method of adjusting a jump value of the booster, in which a load on a valve spring (38) is adjusted by varying the position of a threaded sleeve (50) along the control rod (30).

12 Claims, 2 Drawing Sheets

METHOD FOR ADJUSTING THE JUMP VALUE OF A PNEUMATIC BRAKE-BOOSTER AND BOOSTER FOR IMPLEMENTING THIS METHOD

BACKGROUND OF THE INVENTION

The present invention relates to brake-boosters especially for motor vehicles and applies more especially to adjusting the jump of such boosters.

A brake-booster as defined above generally comprises a control rod which moves towards the front of the vehicle when its driver operates the brake pedal. Valve 34 has a planar front surface 34A engaging valve seat 28A in FIG. 2. This displacement of the control rod is transmitted to an element called a plunger which in its turn operates boosting means. In general, these boosting means consist of a three-way valve whose function is to interrupt the communication between the forward and rear chambers of the booster, in which the same reduced pressure exists in the rest position, and to connect the rear chamber with a pressure source under a higher pressure in order to create a difference in pressure across the two faces of a piston separating these two chambers. Therefore the piston moves towards the front, solidly fixed to an output rod or push rod acting in its turn on a master cylinder, therefore generating an increase in pressure in the hydraulic brake circuit of the vehicle in order to brake the latter.

In a known manner, the piston serving to transmit the boosting force to the output rod or push rod acts on the latter via a reaction disk made from a deformable material such as an elastomer. In the rest position, there is a little play between the front end of the plunger and the reaction disk. The rear end of the plunger forms an annular valve seat coaxial with another annular valve seat formed on the piston, a member forming a valve co-operating with these valve seats.

In such boosters, the reaction to the brake pedal only becomes noticeable when the boosting force generated by the booster passes a certain threshold. This threshold is called the "jump" of the booster. It constitutes an important feature of the booster. In effect, while the existence of the jump is essential for an immediate braking response during the operation of the pedal, the vehicle manufacturers generally wish the value of this jump to remain within certain limits in order that the boosting does not attain too large a value without increasing the reaction to the brake pedal.

From DE-A-3 205 268 is known means for adjusting the load of the operating rod spring in order to control the jump value. Nevertheless, taking into account especially the manufacturing tolerances of the various pieces constituting the booster, large variations in the value of the jump may exist from one booster to another in a production run.

A method is known from document FR-A-2,480,898 for adjusting the value of the jump of a booster, a method according to which the play existing between the front face of the plunger and the reaction disk is adjusted. This method presents numerous disadvantages in that it is long and complicated and that in addition in order to carry it out it is necessary to use ultrasonic or heating means in order to deform plastically a valve part comprising a supplementary piece between the plunger and the reaction disk. In addition the major disadvantage of this method resides in the fact that the adjustment must be carried out before assembling the reaction disk, and consequently the booster itself. It follows that the various pieces have to be carefully matched.

SUMMARY OF THE INVENTION

The object of the present invention is therefore a method for adjusting the jump value of a booster that is simply and rapidly implemented, reliably and with little effort, and in addition may be applied to a booster after assembly thereof.

To this end, the present invention provides a method for adjusting the jump value of a brake-booster, in which booster there are movably mounted a hollow boosting piston dividing the booster into a front chamber and a rear chamber, a control rod urged towards the rear by a rod spring and carrying a plunger housed in the piston, the rear end of the plunger forming a first annular valve seat concentric with a second annular valve seat carried by the boosting piston, the first and second valve seats co-operating with a ring valve carried by the boosting piston and urged to the front by a valve spring, a reaction disk being interposed between an annular front face of the booster piston and a rear face of a push rod, which method is characterized in that it consists of the following steps:

applying a vacuum to the front chamber,
loading the valve spring,
applying to the push rod a force equal to the boosting force corresponding to the jump desired for the booster,
putting the front face of the plunger in contact with the rear face of the reaction disk,
unloading the valve spring until the opening of the first valve seat,
loading the rod spring.

A further object of this invention is to create a brake-booster whose jump is simply, rapidly, reliably and effortlessly adjusted, this adjustment being able to be carried out on an assembled brake-booster.

To this end, the present invention provides a brake-booster in which are movably mounted a hollow boosting piston, an operating rod urged to the rear by a rod spring and carrying a plunger housed in a tubular rear part of the piston, the rear end of the plunger forming a first annular valve seat concentric with a second annular valve seat carried by the boosting piston, the first and second valve seats co-operating with an annular valve carried by the boosting piston and urged to the front by a valve spring, a reaction disk being interposed between a front annular face of the boosting piston and a rear face of a push rod, in which booster the valve spring bears on the rear face of the annular valve and on the control rod.

BRIEF DESCRIPTION OF THE DRAWINGS

One particular embodiment of the present invention will now be described by way of example with reference to the accompanying drawings in which.

DETAILED DESCRIPTION OF THE INVENTION

Figure 1:
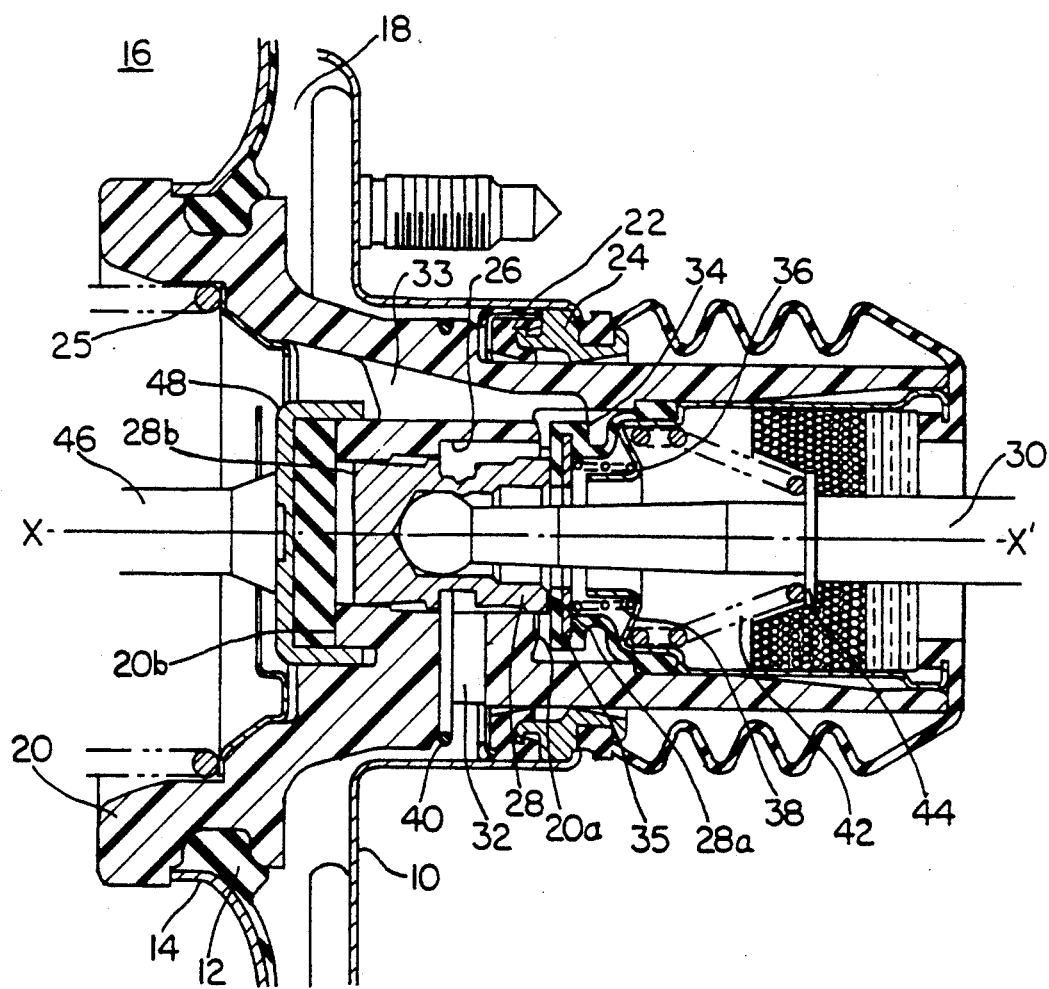
FIG. 1 is a side view in longitudinal section representing the central part of a brake-booster of conventional design.

FIG. 1 represents a section of the central part of a brake-booster intended to be placed in a conventional manner between the brake pedal of a vehicle and the master cylinder controlling the hydraulic brake circuit of this vehicle. By convention, the part of the booster oriented towards the master cylinder is called the front of the booster and the part oriented towards the brake pedal is called the rear of the booster. In FIG. 1, the front is to the left and the rear to the right.

The booster of FIG. 1 comprises an exterior envelope 10 in the form of a shell, presenting a symmetry of revolution about an axis X—X'. Only the central rear part of this envelope 10 is represented in FIG. 1.

A supple elastomeric membrane 12, reinforced in its central part by a metal support disk 14, defines in the interior of the space delimited by the envelope 10 a front chamber 16 and a rear chamber 18. The peripheral exterior edge (not shown) of the membrane 12 is sealingly fixed on the exterior envelope 10. The interior peripheral edge of this membrane terminates in a bead sealingly received in an annular groove formed on the peripheral exterior surface of a hollow boosting piston 20 arranged in line with the axis X—X' of the booster. This hollow piston 20 is extended to the rear by a tubular part which sealingly passes through the rear wall of the envelope 10. The fluid-tightness of this passage is ensured by a reinforced annular seal 22 which is fixed by a ring 24 in a central tubular part extending the rear wall of the envelope 10 toward the rear.

A compression spring 25 interposed between the piston 20 and the front wall (not shown) of the exterior envelope 10 normally maintains the piston in its rear rest position illustrated in FIG. 1, in which the rear chamber 18 has its minimum volume and the forward chamber 16 its maximum volume.

In the central part situated between the rear tubular part and the front part in which the membrane 12 is fixed, the piston 20 presents a stepped bore 26 in which a plunger 28 also presenting a symmetry of revolution about the axis X—X' is slideably received. The front end of a control rod 30 of the booster, also arranged about the axis X—X', is mounted in the plunger 28 in the manner of a ball-and-socket joint. The rear end of this rod 30, which projects from the tubular part of the piston 20, is controlled directly by the brake pedal of the vehicle (not shown).

The annular space located between the control rod 30 and the tubular part of the piston communicates with the exterior at the rear of the booster. Towards the front, this same annular space is able to communicate with the rear chamber 18 via a radial passage 32 formed in the central part of the piston, when a three-way valve is operated. This three-way valve comprises an annular valve 34 mounted in the tubular part of the piston and two annular valve seats 20a and 28a respectively formed on the central part of the piston 20 and on the plunger 28.

The valve 34 forms the front end, of smaller diameter, of a flexible elastomeric sleeve whose rear end terminates in a bead sealingly mounted in the interior of the tubular part of the piston 20. This bead is held is place by a metal cup 36, on which bears a compression spring 38 or valve spring tending to displace the valve 34 towards the front. The valve 34 is constituted by the elastomeric material of the flexible sleeve in which a rigid insert 35 is placed in order to ensure its non-deformability.

The annular valve seat 28a is formed on the rear end face of the plunger 28. In a similar way, the valve seat 28a is formed on the rear end face of the central part of the piston 20, around the seat 28a. Depending on the position of the plunger 28 inside the piston 20, this arrangement allows the valve 34 to bear constantly and sealingly on at least one of the valve seats 28a and 20a under the action of the spring 38.

A second passage 33 is formed in the central part of the piston 20, approximately parallel to the axis X—X' thereof, to make the front chamber 16 of the booster communicate with an annular chamber formed about the valve 34, in the interior of the tubular part of the piston. When the plunger 28 occupies its rear rest position illustrated in the Figure, in which the valve 34 sealingly bears on the seat 28a of the plunger and is separated from the seat 20a of the piston, the front chamber and rear chamber 16 and 18 of the booster thus communicate with each other by the passages 33 and 32.

In a known manner, at least one stop member 40 mounted in the central part of the piston 20 delimits the axial stroke of the plunger 28 within the latter. The plunger 28 is normally maintained in its rear rest position defined by the member 40 by means of a compression spring 42 or rod spring interposed between the cup 36 and a washer 44, itself bearing on a shoulder formed on the control rod 30.

In its central part, the piston 20 comprises an annular front face 20b into the center of which opens the bore 26. This annular front face 20b of the piston 20 acts on the rear face of a push rod 46 through a reaction disk 48 made from a deformable material such as an elastomer. More precisely, the push rod 46 and the reaction disk 48 are arranged along the axis X—X' of the booster, in the extension of the operating rod 30 and of the plunger 28.

While the booster is installed on a vehicle, the front chamber 16 is permanently connected to a vacuum source.

Initially, the pressing down of the brake pedal by the vehicle driver has the effect of equaling the preload of the spring 42 minus the preload force of the spring 38. During the small movement which follows, the front and rear chambers 16 and 18 of the booster are therefore isolated from each other. During this first phase of the operation of the booster, the force exerted on the operating rod 30 does not generate any force on the push rod 46 at the output of the booster.

In a second phase of the operation of the brake, the plunger is displaced sufficiently towards the front for the valve 34 to be in sealing contact with the seat 20a of the piston and a short distance from the seat 28a of the plunger. Under these conditions, the rear chamber 18 of the booster is isolated from the front chamber 16 and communicates with the atmosphere. A boosting force is therefore generated which tends to displace the piston 20 towards the front. This displacement is transmitted to the push rod 46 by the reaction disk 48.

During this second phase of operation of the brakes, the boosting force exerted by the piston 20 does not sufficiently deform the reaction disk 48 for this totally to fill the space that initially separates it from the plunger 28. Consequently, the output force applied to the master cylinder by the output rod 46 suddenly increases, while the force exerted on the control rod 30 stays the same.

This sudden increase in the output force corresponds to the jump of the booster, that is to say the threshold above which the boosting force generated in the booster and exerted on the reaction disk 48 by the piston 20 becomes large enough for the front face 28b of the plunger to come into contact with the reaction disk 48.

In a third phase of the operation of the brakes, any increase in the force exerted by the driver on the control rod 30 generates an increase in the boosting force exerted on the piston, which translates into an increase in the reaction to the pedal exerted by the disk 48 on the plunger 28, then in contact one with the other.

During the second and third phases, the front face of the valve 34 and the seats 20a and 28a are practically aligned. This position is called the equilibrium position.

After the preceding explanations, it will readily be understood that the jump of the booster, that is to say the value of the sudden rise in the output force, as well as the moment at which it enters into effect during the movement of the plunger 28 with respect to the piston 20, as well as the second phase described above, is of fundamental importance for the functioning of the booster. Nevertheless, as already indicated, as a function of the manufacturing tolerances of the various pieces constituting the booster and of the materials forming the reaction disks, there may exist large differences in the value of the jump from one booster to another in a production run.

In accordance with the present invention, an adjustment method for reducing or even eliminating the range of jump variation of boosters due to the varying manufacturing tolerances, or even for obtaining a booster able to have any required value of jump, is provided without the necessity of dismantling the booster.

Such a method is illustrated with reference to FIG. 2, where the same elements as those in FIG. 1 carry the same reference symbols.

Figure 2:
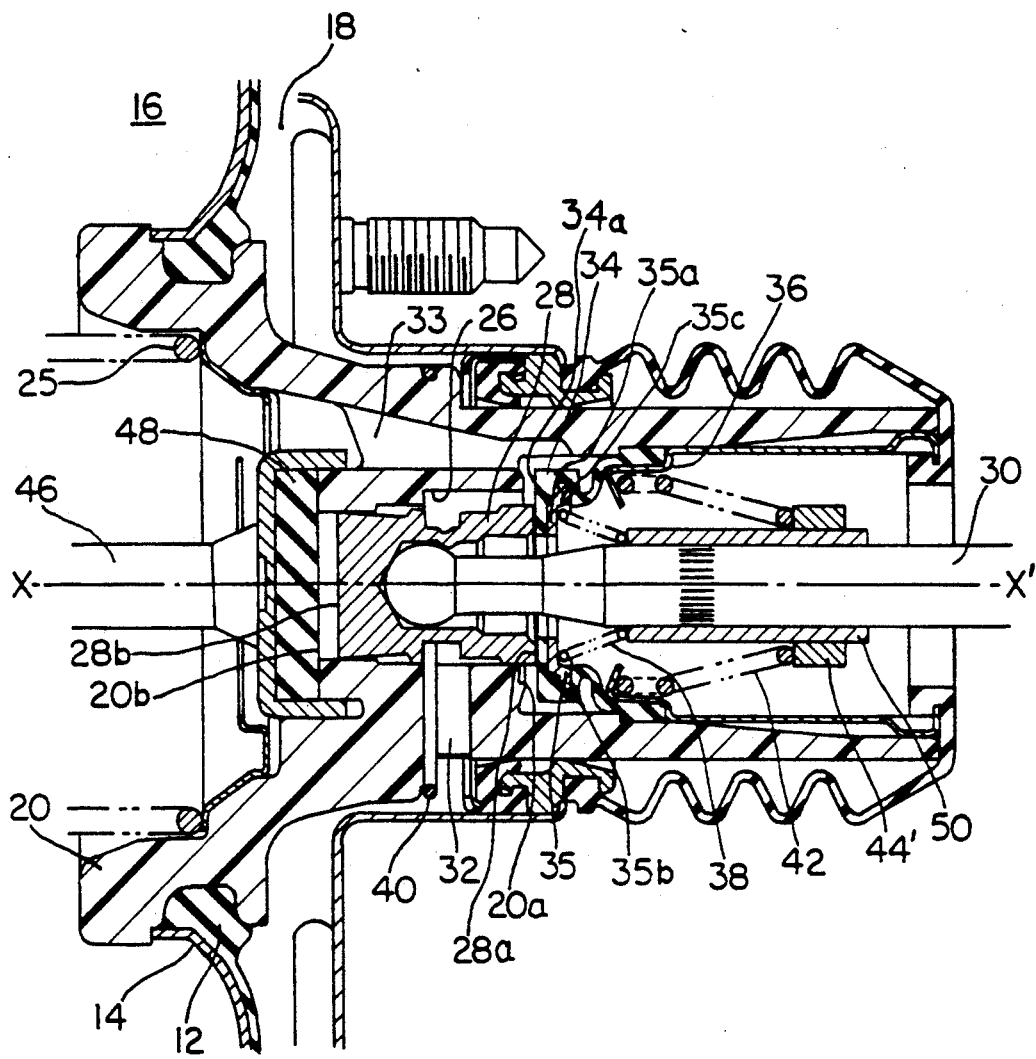
FIG. 2 is a side view in longitudinal section representing the central part of a brake-booster whose jump value may be adjusted according to the invention.

Shown in FIG. 2 is a modified booster for carrying out the method according to the invention. In FIG. 2 only the elements of the booster required to explain the method of the invention are shown, that is to say those that are contained in the rear tubular part of the piston 20.

In FIG. 2, it will be seen that the valve spring 38, bearing on the rear face of the valve 34 on the one hand, bears on the other hand on the control rod 30. More precisely, the valve spring 38 bears on the front end of a sleeve 50 engaged on the control rod 30, for example by screwing. In addition, the washer 44 appears in the form of a nut 44' screwed on the sleeve 50. The metal cup 36 acts only as a rest for the rod spring 42 and as a catch for the valve bead in the tubular rear part of the piston 20.

In addition, the rigid insert 35 is no longer implemented in a plane configuration in the form of a washer, but according to a stepped configuration. More precisely, the insert is conformed in two planes, a first plane 35a, corresponding to the part of the valve 34 co-operating with the valve seat 28a of the plunger 28, and situated at the front on the side of the internal periphery closer to the axis X—X', and a plane 35b, corresponding to the part of the valve 34 co-operating with the valve seat 20a of the piston 20 and situated at the rear on the side of the exterior periphery of the insert 35, the two parts 35a and 35b being joined by a part 35c in the shape of a truncated cone. In this way, the insert 35 gives the valve 34 great rigidly for the valve seat 28a of the valve 28, and a good deformability or elasticity for the valve seat 20a of the piston 20.

When so constructed, the jump value of the booster represented in FIG. 2 may easily be adjusted according to the method which will now be described, without the need to dismantle the booster. It was shown above that the jump of the booster enters into effect when the operation of the control rod 30 advances the plunger 28, and the valve 34 pushed by the valve spring 38, until the valve 34 is in contact with the valve seat 20a of the piston 20, and the plunger 28 is at a short distance from the valve 34.

Initially, after assembly of the booster, and with this in the rest position, the forward chamber 16 of the booster is connected with a vacuum source in a conventional manner. A low pressure is therefore created in the forward chamber 16 and the rear chamber 18 of the booster which communicate by the passage 33, the annular volume about the piston 28 and the passage 32.

Then the sleeve 50 is screwed on the control rod 30 in order to apply to the valve spring 38 a load which is greater than that which will be applied thereto in permanent operation. In this manner, the valve 34 is put into contact with the valve seats 28a of the plunger 28 and 20a of the piston 20, the effect of which is to isolate the front and rear chambers 16 and 18 of the booster from each other, the rear chamber 18 conserving the low pressure which prevailed therein before this operation. In this first phase, the nut 44' is not yet screwed onto the control rod 30 so that the rod spring 42 is completely relieved from pressure.

Then a force equal to the boosting force corresponding to the booster jump required is applied from the exterior to the push rod 46. The application of this exterior force has the effect of making the reaction disk 48 deform by an amount equal to that which would occur during normal operation by actuation of the control rod 30.

Next, by a thrust on the control rod 30, the front face of the plunger 28b is moved into contact with the rear face of the deformed reaction disk 48. This contact is easily detected by any method, for example by a stress gauge placed between the control rod 30 and the device that operates it.

In this position corresponding to the desired jump of the booster, the two valve seats 20a and 28a of the piston 20 and the plunger 28 respectively are in contact with the valve 34, because a load greater than that required for normal operation of the booster has been applied to the valve spring 38. Then the control rod 30 is immobilized in this position.

Next the stress exerted on the valve 34 is released by unscrewing the sleeve 50 until the point where the valve 34 leaves the valve seat 28a of the plunger 28, while staying in contact with the valve seat 20a of the piston. This is made possible owing to the elasticity of the valve 34 in its region which co-operates with the valve seat 20a. The moment when the valve 34 leaves the valve seat 28a may easily be detected because, at that moment, the rear chamber 18 is connected by the passage 32 to the air under atmospheric pressure present around the control rod 30. The forward chamber 16 still being under reduced pressure, and the valve seat 20a of the piston 20 still being closed owing to the elasticity of the valve 34 at this place, a force is created, which is due to the difference in pressure across the two faces of the piston 20, and this is hence transmitted to the push rod 46.

It is apparent therefore that the moment when the valve seat 28a leaves the valve 34 is detected, for example with a strain gauge, by the increase in the force exerted on the push rod 46. This moment may also be detected by the sucking in of air at the rear of the booster for a filling of the rear chamber. It is at this moment that the turning of the sleeve 50 is stopped because the desired adjustment has then been obtained. The sleeve 50 is then immobilized with respect to the control rod 30 by any known means, such as with a lock nut screwed on the rod 30 behind the sleeve 50.

The loads exerted on the push rod 46 and the control rod 30 are then released. The booster then returns to its rest position. The nut 44' on the sleeve 50 fixed to the operating rod 30 can then be screwed in order to compress the rod spring 42 and thus adjust to the required value the input force necessary to operate the booster whose jump value has just been adjusted. The nut 44' may then be fixed to the sleeve 50 by any means, for example by a lock nut.

Under these conditions, the first phase of operation of the brake as described above is identical, the force exerted on the rod 30 has the sole effect of moving the valve 34 towards the seat 20a of the piston 20. The forward and rear chambers 16 and 18 are isolated one from the other and the push rod 46 does not undergo any displacement.

On the other hand, it was shown above that during the second phase of operation of the brake, that is to say when the valve 34 is in contact with the seat 20a of the piston 20 and at a short distance from the seat 28a of the plunger, air under atmospheric pressure is admitted into the rear chamber, which has the effect of creating a boosting force on the piston 20 which then suddenly moves to the front until the induced deformation of the reaction disk leads the rear face of the latter to come into contact with the front face of the plunger 28b, that is to say to fill the space or the play existing at rest between these two faces represented by the distance between the front face of the plunger 28b and the annular front surface 20b of the piston 20.

Therefore it is apparent that, by the displacement of the sleeve 50 with respect to the control rod 30, for example by a rotation causing its screwing or unscrewing, it is possible to modify the load of the valve spring 38 on the valve 34, and owing to the elasticity of the latter in the exterior part co-operating with the valve seat 20a, the seat 20a is caused to penetrate more or less into the valve 34, in this manner causing the adjustment allowing the plunger 28 to be positioned in the appropriate place to obtain the required jump. Therefore it is possible to modify the jump of the booster at will, without the need of dismantling it.

What is claimed is:

1. An assembled brake-booster in which is movably mounted a hollow boosting piston, a control rod urged to the rear by a rod spring and carrying a plunger housed in a tubular rear part of the piston, a rear end of the plunger forming a first annular valve seat concentric with a second annular valve seat carried by the boosting piston, the first and second valve seats co-operating with an annular valve carried by the boosting piston and urged forwardly by a valve spring, a reaction disk being interposed between a front annular face of the boosting piston and a rear face of a push rod, and the valve spring bearing on a rear face of the annular valve and on a sleeve adjustably mounted on the control rod, adjustable displacement of said sleeve with respect to the control rod allowing an adjustment of the load of the valve spring the assembly of the brake-booster.

2. The booster according to claim 1, wherein the load of the valve spring is adjustable by rotation of the sleeve with respect to the rod.

3. The booster according to claim 1, wherein the annular valve comprises a rigid insert of a configuration stepped in two planes.

4. The booster according to claim 3, wherein the rigid insert presents a first plane in a part of the valve co-operating with the first valve seat and a second plane in a part of the valve co-operating with the second valve seat.

5. The booster according to claim 4, wherein the first plane is situated in front of the second plane.

6. The booster according to claim 1, wherein the rod spring bears on a member fixed on the sleeve, a displacement of the member with respect to said sleeve effecting an adjustment of the load of the rod spring.

7. The booster according to claim 6, wherein the load of the rod spring is adjustable by rotation of the member, which comprises a nut, with respect to the sleeve.

8. A method for adjusting a jump value of a brake-booster, in which booster there is movably mounted a hollow boosting piston dividing the booster into a front chamber and a rear chamber, a control rod urged rearwardly by a rod spring and carrying a plunger housed in the piston, a rear end of the plunger forming a first annular valve seat concentric with a second annular valve seat carried by the boosting piston, the first and second valve seats co-operating with an annular valve carried by the boosting piston and urged forwardly by a valve spring, a reaction disk being interposed between an annular front face of the boosting piston and a rear face of a push rod, said method being characterized in that the method comprises the following steps:

applying a vacuum to the front chamber, loading the valve spring, applying to the push rod a force equal to a boosting force corresponding to the desired jump valve of the booster, putting a front face of the plunger in contact with a rear face of the reaction disk, unloading the valve spring until the opening of the first valve seat, and loading the rod spring.

9. The method according to claim 8, wherein the step consisting of loading the valve spring is obtained by displacement of a sleeve with respect to the control rod.

10. The method according to claim 8, wherein the opening of the first valve seat is detected by measuring a loss in pressure.

11. The method according to claim 8, wherein the opening of the first valve seat is detected by the increase in the force exerted on the push rod.

12. The method according to claim 8, wherein the step consisting of loading the rod spring is obtained by rotating a nut with respect to the sleeve.

* * * * *